United States Patent Office 3,536,588
Patented Oct. 27, 1970

3,536,588
METHOD OF ENZYME DETERMINATION
Reinhard Haschen and Wolfgang Farr, Halle, and Dieter Reichelt, Bitterfeld, Germany, assignors to VEB Arzneimittelwerk Dresden, Radebeul, Germany
No Drawing. Filed Jan. 3, 1968, Ser. No. 695,365
Int. Cl. G01n 31/14
U.S. Cl. 195—103.5       5 Claims

ABSTRACT OF THE DISCLOSURE

A method of testing a substance, most commonly blood plasma or blood serum, to quantitatively determine the presence of leucinaminopeptidase, in which the substance is mixed with DL-leucin hydrazide whereby leucinaminopeptidase present in the substance hydrolytically splits the DL-leucin hydrazide into L-leucin and hydrazine, then to the resultant mixture is added coloring reagent constituted of an aromatic aldehyde whereby the aldehyde reacts with the hydrazine to form an orange-red-colored salt having a characteristic light absorption maximum and, finally the quantity of the salt is photometrically determined.

---

This invention relates to a method of enzyme determination which is particularly suitable for the quantitative colorimetric determination of leucinaminopeptidase (LAP) in blood plasma and blood serum.

Methods for quantitative determination of the enzymatic activity of leucinaminopeptidase are known. In certain of these known methods, leucinamid is employed as the specific substrate. For example, leucin set free from leucinamid by LAP can be quantitatively determined by titrimetric determination of carboxyl groups or basic groups.

In another method, leucin which has been set free from leucinamid by enzyme action is separated by means of paper chromatography, the leucin is transformed to a colored substance by means of ninhydrin, the colored substance serving as a colorimetric indicator after stabilization with $Cu^{++}$ ions.

In yet another method, ammonia freed from leucinamid by the enzyme can be reacted with boric acid and, finally, be titrated with acid.

Also, the increase in amino nitrogen effected by the enzyme can be measured by means of the ninhydrin method.

In yet other methods, determination of LAP is accomplished with the used of chromagen substrata. p-Nitroaniline set free by the action of LAP on leucin-p-nitroanilide can be directly photometrically determined on the basis of a yellow color. β-Naphthylamine set free by the action of LAP on leucin-β-naphthylamide can be converted to a colored substance by reaction with a diazonium salt and the colored substance can be colorimetrically determined.

The aforementioned known methods have many disadvantages and are not suitable for routine work because they are cumbersome. Additionally, in the case of methods employing leucinamide much time is involved and the tests are not sufficiently sensitive. In the case of the methods involving chromogen substrate, there is insufficient specificity since p-nitroanilide and β-naphthylamide are hydrolyzed by amino acid aryl amidase, i.e., an enzyme different from LAP.

The purpose of this invention is to provide a method for determining LAP which is sufficiently sensitive and simple for routine clinical diagnosis of liver parenchymatous damage.

According to the invention, there is provided a substratum which is specific for LAP and the decomposition product of which is simply and quickly determinable by means of a highly sensitive indicator reaction. More particularly, according to the invention, it has been found that DL-leucin hydrazide may be used as the substratum. LAP, in the same concentrations, with the same specificities and under the same conditions as in the case of L-leucinamide as the substratum, decomposes L-leucin hydrazide as the substratum, the DL-leucin hydrazide being hydrolytically split by the LAP into L-leucin and hydrazine.

Accordingly, the method of the invention comprises contacting DL-leucin hydrazide with the material which it is desired to test for the presence of LAP whereby any LAP present decomposes the DL-leucin hydrazide into L-leucin and hydrazine, and mixing the product of said decomposition with an aromatic aldehyde, preferably p-dimethylaminobenzaldehyde, whereby the aldehyde reacts with the hydrazine to form a yellow compound.

Other aromatic aldehydes which may be employed are:

4-diethylaminobenzaldehyde,
3-nitro-4-dimethylaminobenzaldehyde.

The hydrolysis of the DL-leucin hydrazide by the LAP is carried out at a pH of from 9.0 to 10.2. After a period of time sufficient for the hydrolysis, 5 to 120 minutes, at 20 to 37° C., the aromatic aldehyde in hydrochloric acid solution is added, whereby an orange-red colored salt is formed and the enzymatic reaction is terminated. The aforementioned orange-red colored salt has a high molar absorption coefficient so that the sensitivity of detection of LAP is considerably greater than the sensitivities of the known methods.

The amount of the orange-red colored salt which is formed is proportional to the amount of the LAP which was present, and the amount of the orange-red colored salt is measured colorimetrically by its absorption maximum of 455 mμ.

The period when the substance being tested and the DL-leucin hydrazide are combined but the aldehyde has not yet been added is known as an "incubation" period. In another embodiment, before the incubation period, there may be a pre-incubation period, generally of 5 to 120 minutes, at 20 to 37° C., in which the substance being tested is in mixture with a $Mg^{++}$ salt. This pre-incubation or activation results in a subsequent shorter incubation period, generally 5 to 60 minutes.

The invention will now be further described by reference to the following examples:

EXAMPLE 1

A substratum is provided consisting of 0.5 ml. of a 25° C. buffered solution constituted of four parts of aqueous 0.2 M monoethanolamine buffer solution having a pH of 10.15 and one part of 112 millimolar aqueous DL-leucin hydrazide solution. To the substratum is added 0.2 ml. of blood serum and incubation is allowed to proceed for a period of 60 minutes. Then 5 ml. of a coloring reagent is added; the coloring reagent consists of one part of a solution of four g. of p-dimethylaminobenzaldehyde in 100 ml. of 96% weight concentration aqueous ethanol or methanol and 17 parts of 0.1 N hydrochloric acid. After an additional 30 minutes, the color development of the compound formed, with respect to an absorption maximum of 455 mμ as compared with the coloring reagent is measured. As as control, a second assay of the same composition is set up, but the enzyme solution is added after the addition of the coloring reagent.

EXAMPLE 2

0.3 ml. of a buffered activator solution constituted of 5 parts of 0.25 M monoethanolamine buffer solution having a pH of 9.25 and 1 part of 40 millimolar $MgCl_2$ solution is added to 0.1 ml. of blood serum and pre-incubation is allowed to proceed for 2 hours at 25° C. Thereafter, 0.1 ml. of 80 millimolar aqueous leucin hydrazide solution is added and incubation is allowed to proceed for 30 minutes at 25° C. Then 4.5 ml. of the same coloring reagent as in Example 1 is added and color development is allowed to proceed and measurement is made as in Example 1. Also, by the procedure of Example 1, as a control, a second assay of the same composition is set up, the enzyme solution is added after the addition of the coloring reagent.

While the invention has been described by reference to certain preferred embodiments thereof, it is to be understood that the scope of the invention as defined by the appended claims is intended to include not only what has been described above but also all modifications and variations thereof which would be obvious to one skilled in the art.

What is claimed is:

1. Method of testing a substance of the group consisting of blood plasma or blood serum to quantitatively determine the presence of leucinaminopeptidase, comprising mixing the substance with L-leucinhydrazide while maintaining a pH of from 9.0 to 10.2 for an incubation period of 5 to 120 minutes whereby leucinaminopeptidase present in the substance hydrolytically splits the DL-leucinhydrazide into L-leucin and hydrazine, adding to the resultant mixture a coloring reagent comprising p-dimethylaminobenzaldehyde whereby the aldehyde reacts with the hydrazine to form an orange-red-colored salts, said salt having a light absorption maximum of 455 m$\mu$, and hydrolysis of the leucinaminopeptidase is terminated and photometrically determining the quantity of said salt present.

2. A method according to claim 1, further comprising, before mixing the substance with DL-leucinhydrazide, mixing the substance with an $Mg^{++}$ salt and allowing the resultant mixture to stand for a pre-incubation period of 5 to 120 minutes and in which the incubation period is 5 to 60 minutes.

3. A method according to claim 1, in which the temperature is maintained at 20–37° C. during the incubation period.

4. A method according to claim 2, in which the temperature is maintained at 20–37° C. during both the pre-incubation and the incubation period.

5. A method according to claim 1, in which the coloring reagent comprises a hydrochloric acid solution of the p-dimethylaminobenzaldehyde.

References Cited

Mellor, Comprehensive Treatise, on Inorganic & Theoretical, Chem. vol. 8, 320, 1928.

Goldbarg et al. "Cancer," vol. II No. 2, pp. 283–291, 1958.

Szasz. "Am. J. Clin. Path," 47:607–613, May 1967.

Smith et al. "J. Biol. Chem," 180:1209–1223, 1949.

ALVIN E. TANENHOLTZ, Primary Examiner

M. D. HENSLEY, Assistant Examiner

PO-1050
(5/69)

UNITED STATES PATENT OFFICE
CERTIFICATE OF CORRECTION

Patent No. 3536588          Dated   October 27, 1970

Inventor(s) Reinhard HASCHEN ET AL.

It is certified that error appears in the above-identified patent and that said Letters Patent are hereby corrected as shown below:

In column 3, claim 1, line 4

" with L - leucinhydrazide" should read

-- DL-leucinhydrazide --

SIGNED AND
SEALED
JAN 5 1971

(SEAL)
Attest:

Edward M. Fletcher, Jr.
Attesting Officer

WILLIAM E. SCHUYLER, JR.
Commissioner of Patents